US005662735A

United States Patent [19]

Pifferi

[11] Patent Number: 5,662,735

[45] Date of Patent: Sep. 2, 1997

[54] CHEMICAL SOLUTION FOR DETECTING COUNTERFEIT PAPER CURRENCY

[76] Inventor: Piergiorgio Pifferi, Bologna, Italy

[21] Appl. No.: 569,237

[22] PCT Filed: Jul. 6, 1994

[86] PCT No.: PCT/IT94/00107

§ 371 Date: Jan. 11, 1996

§ 102(e) Date: Jan. 11, 1996

[87] PCT Pub. No.: WO95/02869

PCT Pub. Date: Jan. 26, 1995

[30] Foreign Application Priority Data

Jul. 14, 1993 [IT] Italy ................................ BO93A0324

[51] Int. Cl.$^6$ .............................. C09D 11/00; B41M 3/14

[52] U.S. Cl. ................................................ 106/31.2; 427/7

[58] Field of Search ................................ 106/21 R, 21 A; 427/7

[56] References Cited

U.S. PATENT DOCUMENTS

| | | | |
|---|---|---|---|
| 3,632,364 | 1/1972 | Thomas et al. | 106/21 C |
| 3,663,243 | 5/1972 | Stryker et al. | 106/21 R |
| 4,051,283 | 9/1977 | Thomas et al. | 106/21 D |
| 5,063,163 | 11/1991 | Carmeli | 436/94 |
| 5,261,954 | 11/1993 | Collings | 106/21 R |
| 5,393,556 | 2/1995 | Romano | 106/21 A |

OTHER PUBLICATIONS

The International Search Report dated May 12, 1995.

Chemical Abstracts published by the American Chemical Society, vol. 83, pp. 1 and 135, Oct. 1975.

International Publication No.: WO 84/03295 dated 30 Aug. 1984.

*Primary Examiner*—Helene Klemanski
*Attorney, Agent, or Firm*—McAulay Fisher Nissen Goldberg & Kiel, LLP

[57] ABSTRACT

This invention relates to a solution for detecting counterfeit paper currency. The solution contains iodine at a concentration of from 0.005 to 3 grams/liter and one or more solvents selected from the groups consisting of: alcohols, ketones, polyalcohols, esters, ethers, or mixtures thereof of solvents belonging to the same group or to several groups of these solvents. The solvent, if miscible with water, contains distilled water in a ratio of from 99:1 to 1:99 parts by volume. If not miscible in water, the solvent is saturated with distilled water at a temperature of 20° C. The solution is preferably contained in ballpoint pens, fountain pens or other similar dispensers which are then used to countersign the paper currency. A counterfeit currency will cause a visible line to appear on the currency, in about one minute. However, in the case of genuine paper currency, the drawn line of solution does not change color and disappears completely from the countersigned currency.

23 Claims, No Drawings

CHEMICAL SOLUTION FOR DETECTING COUNTERFEIT PAPER CURRENCY

TECHNICAL FIELD

This invention relates to a chemical solution for detecting counterfeit paper currency.

BACKGROUND ART

Counterfeit of paper currency damages greatly not only the economy of a Nation, adopting that particular paper currency, but also the Countries with which the Nation has import-export trade.

The development of the EEC and fall of the barriers within Eastern Europe have increased the counterfeit business.

The U.S. Dollar is the most counterfeit currency, because of its wide distribution.

The possibility of using chemical solutions for detecting counterfeit paper currency must be conducted without leaving any stain on the countersigning banknote, according to the laws of the Countries which forbid marking on any kind of paper currency.

Presently, there are available on the market some devices, using chemical solutions, for detecting counterfeit paper currency.

In U.S. Pat. No. 5,603,163 a chemical solution is described, for detecting counterfeit paper currency, that includes a high concentration of iodine and iodides in an alkaline aqueous-alcoholic solutions and in the presence of elevated hydrogen peroxide concentrations.

When said solution is used to draw a line on a banknote, this drawn line become brown and permanently persists on all countersigned banknotes, even if they are genuine: that is forbidden by all National laws.

Moreover, this cited patent describes the use of toxic or cancerogenic solvents in the chemical solution, such as carbon disulfide, carbon tetrachloride, and chloroform.

Document WO-A-84/03295 discloses an ink composition for use in ink jet printing comprising an aqueous solution of a water soluble dye, a starch staining combination and a viscosity enhancer.

The most important features of this ink are:

increased optical density of a printed dot, achieved by the sum of tinctorial effects of dye on cellulose and $KI+I_2$ starch sizing reaction;

omission of bacteriocide, due to relatively high iodine concentration;

increased water and light permanency.

This ink stains or marks a starch content paper such as xerographic papers, bond papers, cotton filled papers, all of which have a high starch content.

Ink solution always includes a commercial liquid dye together with the $KI_3+I_2$ radical ion combination that reacts with the starch in the paper to produce an organic complex that has a very deep blue colour.

This ink solution is used to provide a significant increase in the optical density of every printing made with the ink itself in comparison with the standard ink.

When said ink solution is used to draw a line on a banknote this drawn line will lie permanently on the countersigned banknotes, due to the high concentration of $KI_3$ and the low volatility of said ink solution.

The described solution and other known solutions have not resolved in a fully effective way the problems connected with the safe detection of counterfeit paper currencies.

DISCLOSURE OF THE INVENTION

The object of the present invention is to propose a chemical solution that can be contained in a suitable dispenser such as a fountain-pen or ball point pen or felt-tip pen or other devices and that is able to detect counterfeit paper currency by its application on the latter, i.e. by drawing a line on the paper currency.

In fact, in the case of a genuine paper currency the drawn line will assume no color, on the contrary, in the case of counterfeit paper currency, the drawn line will assume a color, whose tonality will vary from lilac to lilac-violet or to deep blue or to havana yellow.

A further object of the invention is to propose a solution that can be spread (for example like a line) on the paper currency and after reaction with this latter it leaves no colored trace on the drawn genuine paper currency, because this solution contains a particular concentration of iodine in a suitable organic solvent distilled water mixture.

This represents a safe method to detect counterfeit paper currency, because the iodine contained in the chemical solution reacts with the compounds which are normally present in the paper of counterfeit currency, such as amylose, amylodextrin, starch, or compounds derived from hydrolysis of cellulose, i.e. dextrins of different molecular weights, or organic polymers added during the paper manufacturing process.

On the other hand, in the genuine paper currency the iodine does not find these substances and it does not react during or after the application of the chemical solution onto the paper currency.

BEST MODE OF CARRYING OUT THE INVENTION

The chemical solution is obtained by dissolving metallic iodine in a solvent saturated with distilled water at a temperature of 20° C. or mixed with distilled water in the volumetric ratio ranging from 1:99 to 99:1.

The solvent could be a single compound or a mixture of compounds belonging to the same chemical group or to different chemical groups.

The single compound could be one of the following alcohols: methyl, ethyl, propyl, isopropyl, butyl, isobutyl; one of the following ketones: acetone, ethylketone, methylethylketone, methylprophylketone, prophylketone, diethylketone; one of the following polyalcohols: glycerol, ethylene glycol, propylene glycol, diethylene glycol, hexylene glycol, sorbitol, polyethylene glycols, and 1,2 propylene glycol; one of the following esters of formic, acetic, propionic, lactic acids with the aforementioned alcohols or polyalcohols; one of the following ethers of methyl, ethyl, propyl, butyl alcohols or polyalcohols.

The mixtures of compounds are mixtures in a suitable proportion of single compounds belonging to the same group i.e., alcohol, ketone, polyalcohol, ester, or ether group or of different compounds belonging to the different mentioned groups.

The solvent is added with distilled water at the temperature of 20° C. in the volumetric ratio ranging from 1:99 to 99:1 in the case of the solvents which are completely soluble in water. If the solvent is not completely soluble in water, the distilled water is added to the solvent till its saturation with water is achieved.

The metallic iodine is dissolved in one of the aforementioned solvents, mixed with distilled water in an amber-coloured flask, under a vacuum hood, in the absence of sunlight, at a temperature of 20° C., by magnetic stirring in an inert atmosphere (i.e. nitrogen or carbon dioxide).

Then the solution of iodine is diluted with the chosen solvent previously mixed with water to obtain the desired concentration of iodine, that is, ranging from 0.005 to 3 grams/liter of the solvent.

The preferred chemical solution to detect counterfeit paper currency uses the following solvent: 2-propanol-diethylene glycol-ethylene glycol-distilled water with relative volumetric ratio of 30:10:14:46 added with 2.0 grams of iodine per liter of the above solvent.

A further chemical solution uses the following solvent: propanol-diethylene glycol-ethylene glycol-distilled water with the relative volumetric ratio of 30:10:14:46. This solvent is added with 2.0 grams of iodine per liter of the same solvent.

In order that the present invention may be more fully understood, the following examples are set forth for illustrative, but in no way restrictive, purposes.

EXAMPLE 1

In a one liter volumetric amber-coloured flask, 0.95 grams of metallic iodine were dissolved with 900 ml of methyl acetate to which were added, under moderate stirring at 20° C., 180 m of distilled water, obtaining two liquid phases.

Then the mixture was transferred into a separation funnel obtaining an upper phase of methyl acetate saturated with water, and a bottom phase constituted by water saturated with methylacetate.

To the upper phase was added with 18 ml of 2,3 propylene glycol. This was poured into a dropper or similar dispensing device, for example a felt tip pen: this was the solution used to detect the counterfeit paper currency.

Thus, using a felt tip pen containing the above solution, a line of 2 cm in length was drawn on a genuine Italian bank-notes of 100.000-50.000-10.000-5.000-2.000-1.000 Italian Lire; on the genuine bank-notes of Great Britain, i.e. 10-20-50 Pounds; and on the sheets of the letter paper, of the drawing paper, of the proofing paper and of the photocopy paper.

After 30 seconds from the application of the solution on the genuine bank-notes, none of the tested currency showed any colored lines.

On the contrary, the drawn lines on the other kinds of paper became colored with a tonality ranging from lilac to violet to deep blue.

EXAMPLE 2

1.70 grams of iodine were introduced into an amber-coloured flask and dissolved in one liter of a solution which contained: 400 ml of isopropyl alcohol, 200 ml of ethylene glycol and 400 ml of distilled water.

The solution was put inside a felt tip pen which was used to draw lines of 2 cm in length on genuine 10-50-100 U.S. Dollars, on genuine 10-50-100 German Marks and on the common sheets of letter, proofing, drawing and photocopy papers.

15 second after the application of the solution, no coloured lines appeared on all the genuine paper currency, while the lines drawn on the other sheets of paper were colored lilac, or violet, or bluish-violet, or bluish ashen grey.

EXAMPLE 3

In a two liter amber-coloured flask, under stirring at a temperature of 15° C. and under a fume exhaust hood, 4.6 grams of iodine were dissolved with a solvent mixture containing acetone, propyl alcohol, water in a relative volumetric ratio of 30:45:25.

The above solution was dispensed by a felt tip pen to draw a line of about 2 cm in length on each of the following bank-notes: 100 German Marks, 10 British pounds, 10 Grecian drachms, all of them obtained from a local bank and thus considered genuine. A line was drawn also on several sheets of paper used for different services.

The drawn lines gave no one color on the tested genuine bank-notes; on the contrary, the lines on the sheets of papers immediately gave colours of different tonality, such as lilac-violet or dark bluish or bluish ashen dark grey, according to the different chemical nature of the paper sheets.

EXAMPLE 4

By stirring at 15° C. and under the fume exhaust hood, in a 2 liter amber-coloured flask, 4 grams of iodine were dissolved with a solvent mixture, which contains 2-propanol-diethylene glycol-ethylene glycol-distilled water with relative volumetric ratio of 30:10:14:46.

This solution was dispensed by a felt tip pen to draw a 2 cm line on genuine bank-notes of 2, 5, 10, 50, 100 Canadian Dollars, and also on different paper sheets.

The drawn lines did not assume any coloration on the tested genuine bank-notes, while the lines on the other paper sheets immediately appeared colored with different tonality, such as lilac-violet or dark bluish or bluish ashen dark grey, according to the different chemical nature of each paper sheet.

INDUSTRIAL APPLICABILITY

The described chemical solution could be easily contained inside a suitable dispensing device such as fountain-pen or ball point pen or felt-tip pen.

Moreover, this chemical solution to detect counterfeit paper currency is simply used by drawing a line on the paper currency to be tested. At maximum in about one minute, it is possible to recognise genuine currency because the drawn line disappears completely from the genuine currency. Otherwise for counterfeit currency it assumes a color, whose tonality will vary from lilac to lilac-violet or to deep blue or to havana yellow.

The peculiarity of this chemical solution is that it leaves no trace on any genuine paper currency so that it is compatible with to the laws of every Nations having laws on that matter.

I claim:

1. A chemical solution to detect counterfeit paper currency comprising metallic iodine of 99.9% purity, and a solvent selected from the groups consisting of alcohols, polyalcohols, ketones, esters of the alcohols or the polyalcohols, with formic, acetic, propionic or lactic acid, ethers of methyl, ethyl, propyl, or butyl alcohols, or of the polyalcohols, mixtures of solvents selected from one or more of the groups, the selected solvent being not completely soluble in water and being mixed, at a temperature of 20° C. with distilled water in a volumetric ratio ranging from 99 percent to the volume of saturation of the selected solvent with the distilled water, at the temperature of 20° C., the metallic iodine dissolved at a temperature of 20° C., in the selected solvent.

2. A chemical solution according to claim 1, wherein said selected solution contains metallic iodine at a concentration varying from 0.005 to 3.0 grams per liter.

3. A chemical solution according to claim 1, wherein the alcohols are selected from the group consisting of methyl, ethyl, propyl, isopropyl, butyl, and isobutyl alcohols, and mixtures thereof.

4. A chemical solution according to claim 1, wherein said polyalcohols are selected from the group consisting of glycerol, ethylene glycol, propylene glycol, diethylene glycol, hexylene glycol, sorbitol, polyethylene glycols and 1,2 propylene glycol, and mixtures thereof.

5. A chemical solution according claim 1 wherein said esters are formic, acetic, propionic, or lactic esters of the alcohols selected from the group consisting of methyl, ethyl, propyl, isopropyl, butyl, isobutyl alcohols and mixtures thereof, and of the polyalcohols selected from the group consisting of glycerol, ethylene glycol, propylene glycol, diethylene glycol, hexylene glycol, sorbitol, polyethylene glycols, 1,2 propylene glycol and mixtures thereof.

6. A chemical solution according to claim 1 wherein said ketones are selected from the group consisting of acetone, methyl ethyl ketone, diethyl ketone, propyl ketone, isopropyl ketone and mixtures thereof.

7. A chemical solution according to claim 1 wherein said ethers are of alcohols selected from the group consisting of methyl, ethyl, propyl, isopropyl, butyl, and isobutyl alcohols, and mixtures thereof and of polyalcohols selected from the group consisting of glycerol, ethylene glycol, propylene glycol, diethylene glycol, hexylene glycol, sorbitol, 1,2 propylene glycol and mixtures thereof.

8. A chemical solution according to claim 1 wherein the selected solvent with distilled water has the following formulation:

2-propanol-diethylene glycol-ethylene glycol-distilled water, the relative volumetric ratio being 30:10:14:46; one liter of said solvent used per 2.0 grams of said metallic iodine.

9. A chemical solution according to claim 1 wherein the said solvent with distilled water has the following formulation:

propanol-diethylene glycol-ethylene glycol-distilled water with the relative volumetric ratio being 30:10:14:46; one liter of said solvent used per 2.0 grams of said metallic iodine.

10. A chemical solution to detect counterfeit paper currency comprising metallic iodine of 99.9 percent purity and a solvent selected from the groups consisting of alcohols, polyalcohols, ketones, esters of the alcohols or the polyalcohols with formic, acetic, propionic or lactic acid, ethers of methyl, ethyl, propyl, butyl alcohols or of the polyalcohols, and mixtures of solvents selected from one or more of the groups, the selected solvent being mixed at a temperature of 20° C. with distilled water in a volumetric ratio variable from 99 percent of water to the volume of saturation of the selected solvent with distilled water, at the temperature 20° C. the metallic iodine dissolved at a temperature of 20° C. in the solvent, wherein said esters are formic, acetic, propionic, or lactic esters of the alcohols selected from the group consisting of methyl, ethyl, propyl, isopropyl, butyl, isobutyl alcohols and mixtures thereof, and of the polyalcohols selected from the group consisting of glycerol, ethylene glycol, propylene glycol, diethylene glycol, hexylene glycol, sorbitol, polyethylene glycols and 1,2 propylene glycol and mixtures thereof.

11. A chemical solution according to claim 10 wherein said solution contains metallic iodine at a concentration of from 0.005 to 3.0 grams/liter.

12. A chemical solution according to claim 10 wherein said selected solvent is completely soluble in water and contains distilled water in a volumetric ratio ranging from 1 percent to 99 percent of the mixture, at a temperature of 20° C.

13. A chemical solution to detect counterfeit paper currency comprising metallic iodine of 99.9 percent purity and a solvent selected from the groups consisting of alcohols, polyalcohols, ketones, esters of the alcohols or the polyalcohols with formic, acetic, propionic or lactic acid, ethers of methyl, ethyl, propyl, butyl alcohols or of the polyalcohols, and mixtures of solvents selected from one or more of the groups, the selected solvent being mixed at a temperature of 20° C. with distilled water in a volumetric ratio variable from 99 percent of water to the volume of saturation of the selected solvent with distilled water, at the temperature of 20° C., the metallic iodine dissolved at a temperature of 20° C. in the solvent, said ketones selected from the group consisting of acetone, methyl ketone, ethyl ketone, diethyl ketone, propyl ketone and isopropyl ketone.

14. A chemical solution according to claim 13 wherein said solution contains metallic iodine at a concentration of from 0.005 to 3.0 grams/liter.

15. A chemical solution according to claim 13 wherein said selected solvent is completely soluble in water and contains distilled water in a volumetric ratio ranging from 1 percent to 99 percent of the mixture, at a temperature of 20° C.

16. A chemical solution to detect counterfeit paper currency comprising metallic iodine of 99.9 percent purity and a solvent selected from the groups consisting of alcohols, polyalcohols, ketones, esters of the alcohols or the polyalcohols with formic, acetic, propionic or lactic acid, ethers of methyl, ethyl, propyl, butyl alcohols or of the polyalcohols, and mixtures of solvents selected from one or more of the groups, the selected solvent being mixed at a temperature of 20° C. with distilled water in a volumetric ratio variable from 99 percent of water to the volume of saturation of the selected solvent with distilled water, at the temperature of 20° C., the metallic iodine dissolved at a temperature of 20° C. in the solvent, wherein said ethers are of alcohols selected from the group consisting of methyl, ethyl, propyl, isopropyl, butyl, isobutyl alcohols, and of polyalcohols selected from the group consisting of glycerol, ethylene glycol, propylene glycol, diethylene glycol, hexylene glycol, sorbitol, and 1,2 propylene glycol and mixtures thereof.

17. A chemical solution according to claim 16 wherein said solution contains metallic iodine at a concentration of from 0.005 to 3.0 grams/liter.

18. A chemical solution according to claim 16 wherein said selected solvent is completely soluble in water and contains distilled water in a volumetric ratio ranging from 1 percent to 99 percent of the mixture, at a temperature of 20° C.

19. A chemical solution to detect counterfeit paper currency comprising metallic iodine of 99.9 percent purity and a solvent selected from the groups consisting of alcohols, polyalcohols, ketones, esters of the alcohols or the polyalcohols with formic, acetic, propionic or lactic acid, ethers of methyl, ethyl, propyl, butyl alcohols or of the polyalcohols, and mixtures of solvents selected from one or more of the groups, the selected solvent being mixed at a temperature of 20° C. with distilled water in a volumetric ratio variable from 99 percent of water to the volume of saturation of the selected solvent with distilled water, at the temperature of 20° C., the metallic iodine dissolved at a temperature of 20° C. in the solvent, wherein the selected solvent with distilled water has the following formulation:

2-propanol-diethylene glycol-ethylene glycol-distilled water, the relative volumetric ratio being 30:10:14:46;

one liter of said solution used per 2.0 grams of said metallic iodine.

20. A chemical solution to detect counterfeit paper currency comprising metallic iodine of 99.9 percent purity and a solvent selected from the groups consisting of alcohols, polyalcohols, ketones, esters of the alcohols or the polyalcohols with formic, acetic, propionic or lactic acid, ethers of methyl ethyl, propyl, butyl alcohols or of the polyalcohols, and mixtures of solvents selected from one or more of the groups, the selected solvent being mixed at a temperature of 20° C. with distilled water in a volumetric ratio variable from 99 percent of water to the volume of saturation of the selected solvent with distilled water, at the temperature of 20° C., the metallic iodine dissolved at a temperature of 20° C. in the solvent, wherein the selected solvent with distilled water has the following formulation:

propanol-diethylene glycol-ethylene glycol-distilled water, the relative volumetric ratio being 30:10:14:46; one liter of said solution used per 2.0 grams of said metallic iodine.

21. A method for detecting counterfeit currency comprising the steps of:

providing a paper currency to be tested, providing a chemical solution for detecting counterfeit paper currency comprising metallic iodine of 99.9 percent purity dissolved in a solvent selected from the groups consisting of alcohols, polyalcohols, ketones, esters of said alcohols and of said polyalcohols with formic, acetic, propionic or lactic acid ethers of methyl, ethyl, propyl, and butyl alcohols, ethers of said polyalcohols and mixtures of solvents selected from one or more of the groups, said selected solvent being added to distilled water in a volumetric ratio ranging from 99 percent to the volume of saturation of the selected solvent with distilled water at a temperature of 20° C.

applying said chemical solution to an area of the paper currency; and determining whether a color change takes place, the chemical solution leaving a visible mark only on counterfeit currency, leaving no mark on genuine currency.

22. A method for producing a chemical solution to detect counterfeit paper currency comprising:

providing metallic iodine of 99.9 percent purity;

dissolving the metallic iodine in a solvent selected from the groups consisting of alcohols, polyalcohols, ketones, esters of said alcohols and of said polyalcohols, with formic or acetic or propionic or lactic acid, ethers of methyl, ethyl, propyl, and butyl alcohols or of said polyalcohols, and mixtures of solvents selected from one or more of the groups;

mixing the selected solvent at a temperature of 20° C. with distilled water in a volumetric ratio ranging from 1 percent to 99 percent or to the volume of saturation of the selected solvent with distilled water at a temperature of 20° C.; and, dissolving the metallic iodine at a concentration of from 0.005 to 3.0 grams/liter in the selected solvent with distilled water at a temperature of 20° C. in an amber color flask, in the absence of sunlight, with stirring, in a non-oxidant atmosphere.

23. A chemical solution to detect counterfeit paper currency consisting essentially of metallic iodine of 99.9 percent purity and a solvent selected from the groups consisting of alcohols, polyalcohols, ketones, esters of said alcohols, or of said polyalcohols, with formic, acetic, propionic or lactic acid, ethers of methyl, ethyl, propyl, or butyl alcohols or of said polyalcohols, and mixtures of solvents selected from one or more of the groups, said solvent containing distilled water in a volumetric ratio variable from 99 percent of water to 1 percent or to the volume of saturation of the selected solvent with distilled water, the metallic iodine present at from 0.005 to 3.0 grams/liter.

* * * * *